(12) United States Patent
O'Toole

(10) Patent No.: US 11,075,920 B2
(45) Date of Patent: Jul. 27, 2021

(54) PROVIDING ACCESS TO STRUCTURED STORED DATA

(71) Applicant: LOOKIIMEDIA (UK) LIMITED, London (GB)

(72) Inventor: Julia O'Toole, London (GB)

(73) Assignee: LOOKIIMEDIA (UK) LIMITED, London (GB)

( * ) Notice: Subject to any disclaimer, the term of this patent is extended or adjusted under 35 U.S.C. 154(b) by 243 days.

(21) Appl. No.: 16/316,850

(22) PCT Filed: Jul. 11, 2017

(86) PCT No.: PCT/GB2017/052027
§ 371 (c)(1),
(2) Date: Jan. 10, 2019

(87) PCT Pub. No.: WO2018/011559
PCT Pub. Date: Jan. 18, 2018

(65) Prior Publication Data
US 2019/0238552 A1    Aug. 1, 2019

(30) Foreign Application Priority Data

Jul. 11, 2016  (GB) ...................................... 1612038

(51) Int. Cl.
*H04L 29/08*       (2006.01)
*H04L 29/06*       (2006.01)
(Continued)

(52) U.S. Cl.
CPC .......... *H04L 63/105* (2013.01); *G06F 3/0622* (2013.01); *G06F 3/0637* (2013.01);
(Continued)

(58) Field of Classification Search
CPC . H04L 63/105; H04L 63/083; H04L 63/0861; H04L 63/102; H04L 2463/082;
(Continued)

(56) References Cited

U.S. PATENT DOCUMENTS

2007/0143825 A1* 6/2007 Goffin .................... H04L 63/105
726/2
2014/0373104 A1* 12/2014 Gaddam ................ H04L 63/105
726/4
(Continued)

FOREIGN PATENT DOCUMENTS

EP          0 935 221       8/1999

OTHER PUBLICATIONS

International Search Report of PCT/GB2017/052027 dated Sep. 1, 2017, 3 pages.
(Continued)

*Primary Examiner* — Mahfuzur Rahman
(74) *Attorney, Agent, or Firm* — Nixon & Vanderhye, P.C.

(57) ABSTRACT

Methods, systems, computer programs, and electronically readable media storing computer programs are provided for providing access to a plurality of structured data stores based on a plurality of personal authentication information. A first personal authentication information is received. Upon authenticating the first personal authentication information, access to a first level data store is provided. A second personal authentication information is received, and upon authenticating the second personal authentication information, and after authenticating the first personal authentication information, access is provided to a second level data store.

22 Claims, 12 Drawing Sheets

(51) Int. Cl.
*G06F 3/06* (2006.01)
*G06F 3/0481* (2013.01)

(52) U.S. Cl.
CPC .......... *G06F 3/0673* (2013.01); *H04L 63/083* (2013.01); *H04L 63/0861* (2013.01); *H04L 63/102* (2013.01); *G06F 3/04817* (2013.01); *H04L 2463/082* (2013.01)

(58) Field of Classification Search
CPC .... G06F 3/0622; G06F 3/0637; G06F 3/0673; G06F 3/04817
See application file for complete search history.

(56) References Cited

U.S. PATENT DOCUMENTS

2016/0292493 A1* 10/2016 Gao .................. G06F 21/40
2016/0300414 A1* 10/2016 Lambert ............ G07C 9/00571
2017/0124313 A1* 5/2017 Mann .................. G10L 17/00

OTHER PUBLICATIONS

Communication Pursuant to Article 94(3) EPC dated Oct. 22, 2019 in European Application No. 17 742 835.6, 4 pages.

\* cited by examiner

PROVIDING ACCESS TO STRUCTURED STORED DATA

This application is the U.S. national phase of International Application No. PCT/GB2017/052027 filed Jul. 11, 2017 which designated the U.S. and claims priority to GB 1612038.8 filed Jul. 11, 2016, the entire contents of each of which are hereby incorporated by reference.

FIELD OF INVENTION

The present invention is in the field of data access. More particularly, but not exclusively, the present invention relates to authenticating access to data.

BACKGROUND

Securing access to sensitive data is a challenge, with cyber crime, including account hacking, fraud, financial crimes, and industrial espionage, increasingly on the rise. Thieves and hackers employ various methods to guess usernames and passwords, gaining access to systems and secured data.

Some online providers have addressed security concerns by requiring that users authenticate using increasingly complicated passwords. The complicated passwords are difficult for users to remember, however, because users must remember an ever increasing number of passwords to function in the ecommerce age.

Another solution that online providers have applied is two-factor or multi-factor authentication, which often requires that the user enter a password and a one-time code sent to the user via SMS or email. Multi-factor authentication is more secure than a simple password, but it is still possible for hackers to intercept SMS messages and emails to receive the code.

In addition, when a user forgets a password, the password reset process is often a multi-step process that is frustrating for users. To reset a password, the user must sometimes respond to password reset questions, respond to questions regarding account numbers or other personal information, call a customer service representative, and/or receive and follow a reset link received via email.

One solution to managing and remembering passwords that provide access to secure information is a password manager. The information inside a password manager, which often includes usernames and passwords, is kept in a single data store that can be accessed upon authenticating with a master password. While keeping information in a single data store may not present a problem when the information being protected is not sensitive, some users may not wish to access their most sensitive information every time they access information that is not sensitive. For example, a user wishing to access information relating to a promo website may not wish to access information relating to their bank and investment accounts at the same time.

Another problem with password managers is that some feature master passwords that are not recoverable. A user who forgets an unrecoverable master password may lose access to the information saved forever.

It is an object of the present invention to provide a way to authenticate access to secure data that overcomes the disadvantages of the prior art, or at least provides a useful alternative.

SUMMARY OF INVENTION

According to a first aspect of the invention there is provided a method of providing access to a plurality of structured data stores based on a plurality of personal authentication information. The method comprises:
receiving a first personal authentication information of the plurality of personal authentication information;
upon authenticating the first personal authentication information, providing access to a first level data store of the plurality of structured data stores;
receiving a second personal authentication information of the plurality of login data; and
upon authenticating the second personal authentication information, and after authenticating the first personal authentication information, providing access to a second level data store of the plurality of structured data stores.

The method may further include:
receiving a third personal authentication information of the plurality of personal authentication information; and
upon authenticating the third personal authentication information, and after authenticating the first personal authentication information and the second personal authentication information, providing access to a third level data store of the plurality of structured data stores.

According to a further aspect, at least an alpha personal authentication information of the plurality of personal authentication information may be a first biometric type data.

According to a further aspect, a beta personal authentication information of the plurality of personal authentication information may be a second biometric type data that is different from the first biometric type data.

According to a further aspect, a gamma personal authentication information of the plurality of personal authentication information may be a third data type, and the third data type may be different from the first data type and the second data type.

According to a further aspect, at least one of the plurality of structured data stores may include third party authentication data.

According to a further aspect, the third party authentication data may include a password.

According to a further aspect, at least one data store of the plurality of structured data stores may include at least one of: a data file, a number, or a text string.

According to a further aspect, the plurality of personal authentication information may include at least one of: fingerprint data, a pin code, voice recording information, voice message data, facial image information, iris image information, or retinal image information.

The method may further include the step of:
displaying a data store user interface including secure information from at least one data store of the plurality of data stores.

According to a further aspect, the step of displaying the data store user interface may further include displaying one or more icons associated with the secure information included in the selected data store of the plurality of data stores.

The method may further include:
receiving a data store change request for previously stored secure information, the data store change request including a new data store; and associating the previously stored secure information with the new data store.

The method may further include:
receiving a website registration image file;
recognizing text in the website registration image file including registration related information; and
associating the secure information with a selected data store of the plurality of data stores to which access has been authorized.

According to a further aspect, the registration related information may include at least one of: a website domain, a business name, a user name, a password, a password hint, a password clue, a reset question, an icon, or as reset answer.

The method may further include:
displaying a data store update user interface including secure information from a selected secure store of the plurality of data stores;
receiving updated secure information from the user; and
associating the updated secure information with the selected data store.

According to a further aspect, at least one of the plurality of personal authentication information may further comprise:
receiving the at least one of the plurality of personal authentication information from a client device.

According to a further aspect, authenticating the first personal authentication information or authenticating the second personal authentication information may further comprise:
sending the at least one personal authentication information of the plurality of personal authentication information to a server; and
receiving a personal authentication information confirmation from the server.

According to a further aspect, there is a system configured to provide a structured data protection system via any method of the first aspect.

According to a further aspect, there is a computer program configured to provide a structured data protection system via any method of the first aspect.

According to a further aspect, there is an electronically readable medium configured for storing a computer program configured to provide a structured data protection system via any method of the first aspect.

According to a second aspect of the invention there is provided a method of configuring access to a structured data store comprising:
receiving a first personal authentication configuration information;
saving first saved authentication data based on the first personal authentication configuration information in a user profile;
receiving a second personal authentication configuration information; and
saving second saved authentication data based on the second personal authentication configuration information in the user profile,
wherein authenticating a first personal authentication information of a plurality of authentication information to provide access to a first level data store of the plurality of structured data stores includes using the first saved authentication data, and authenticating a second personal authentication information of the plurality of authentication information to provide access to a second level data store of the plurality of structured data stores includes using the second saved authentication data, after authenticating the first personal authentication information.

The method may further comprise:
receiving a third personal authentication configuration information; and
saving the third personal authentication configuration information as third saved authentication data in the user profile, wherein authenticating a third personal authentication information of the plurality of authentication information to provide access to a third level data store of the plurality of structured data stores includes using the third saved authentication data, after authenticating the first personal authentication information and the second personal authentication information.

The method may further comprise:
receiving a first secure information; and
associating the first secure information with an alpha data store of the plurality of data stores.

The method may further comprise:
receiving a second secure information; and
associating the second secure information with a beta data store of the plurality of data stores.

According to a further aspect, an alpha personal authentication information of the plurality of personal authentication information may be a first biometric type data.

According to a further aspect, a second personal authentication information of the plurality of personal authentication information may be a second biometric type data that is different from the first biometric type data.

According to a further aspect, a gamma personal authentication information of the plurality of personal authentication information may be a third data type, and the third data type may be different from the first data type and the second data type.

According to a further aspect, at least one of the plurality of structured data stores may include third party authentication data.

According to a further aspect, the third party authentication data may include a password.

According to a further aspect, at least one data store of the plurality of structured data stores may include at least one of: a data file, a number, or a text string.

According to a further aspect, the plurality of personal authentication information may include at least one of: fingerprint data, a pin code, voice recording information, voice message data, facial image information, iris image information, or retinal image information.

The method may further comprise:
receiving a website registration image file;
recognizing text in the website registration image file including registration related information, the registration related information including at least one of: a website domain, a business name, a user name, a password, a password prompt, a password clue, a reset question, an icon, or a reset answer; and
associating the secure information with a selected data store of the plurality of data stores to which access has been authorized.

According to a further aspect, receiving at least one of the first personal authentication confirmation information, the second personal authentication confirmation information, or a third personal authentication confirmation information may further comprise:
determining a user input timeout period; and
saving the user input timeout period with the user profile.

The method may further comprise:
receiving a data store change request for previously stored secure information, the data store change request including a new data store; and
associating the previously stored secure information with the new data store.

According to a further aspect, there is a system configured to configure a structured data protection system via any method of the second aspect.

According to a further aspect, there is a structured data protection system via any method of the second aspect.

According to a further aspect, there is an electronically readable medium storing a computer program configured to provide a structured data protection system via any method of the second aspect.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method, system, and computer program to configure and provide access to a plurality of structured data stores based on a plurality of personal authentication information.

Figure 1:
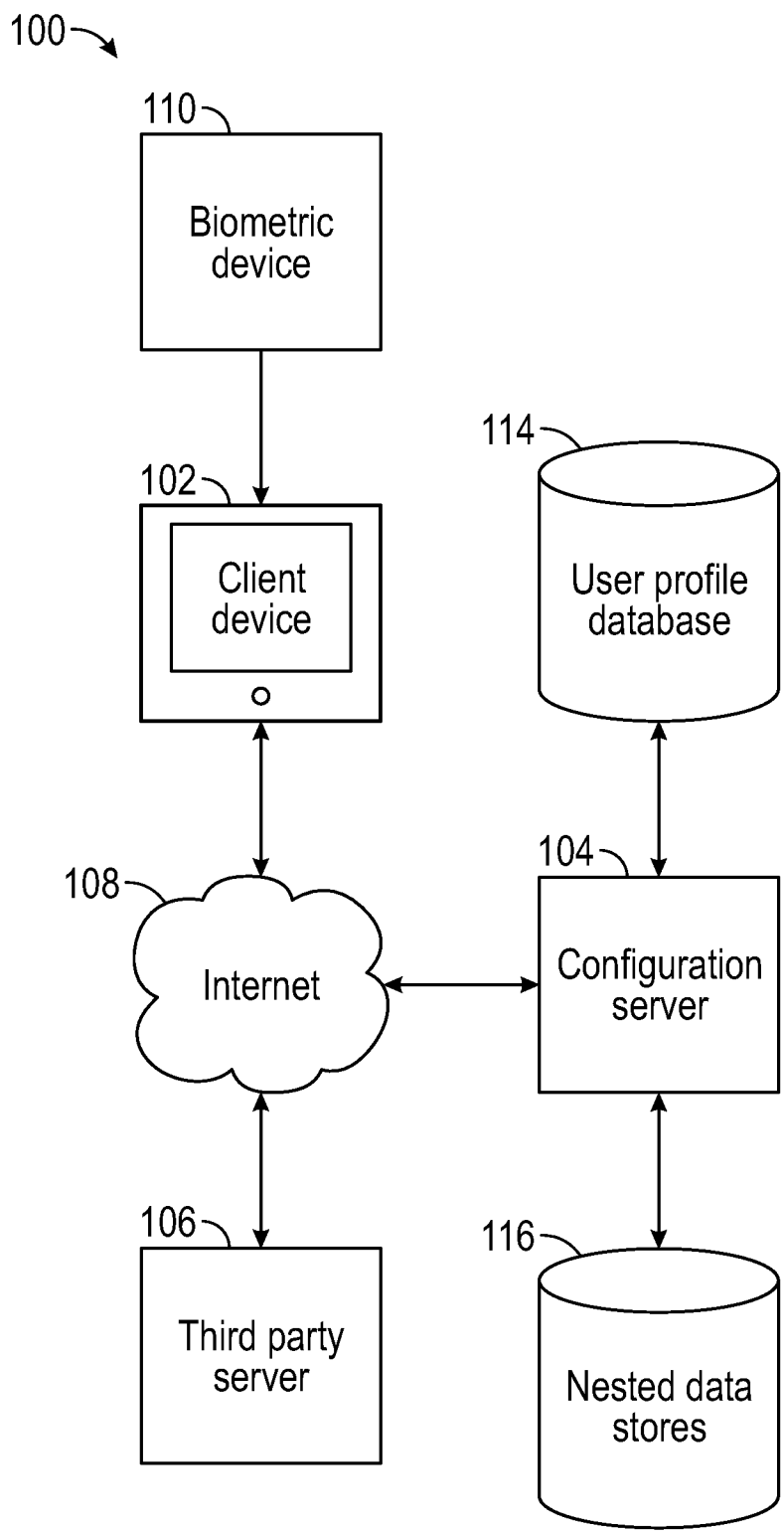
FIG. 1: shows system 100 in accordance with an embodiment of the invention.

FIG. 1 depicts a system 100 in accordance with an embodiment. System 100 includes client device 102. System 100 may further include configuration server 104, third party server 106, Internet 108, biometric device 110, user profile database 114, and structured data stores 116.

Client device 102 may be operable to configure and provide a user access to a plurality of structured data stores based on a plurality of personal authentication information, as described in relation to FIGS. 4 to 12. Configuration server 104 may further be operable to facilitate configuring and provide access to a plurality of structured data stores based on a plurality of personal authentication information, as described in relation to FIGS. 4 to 12.

Figure 2:
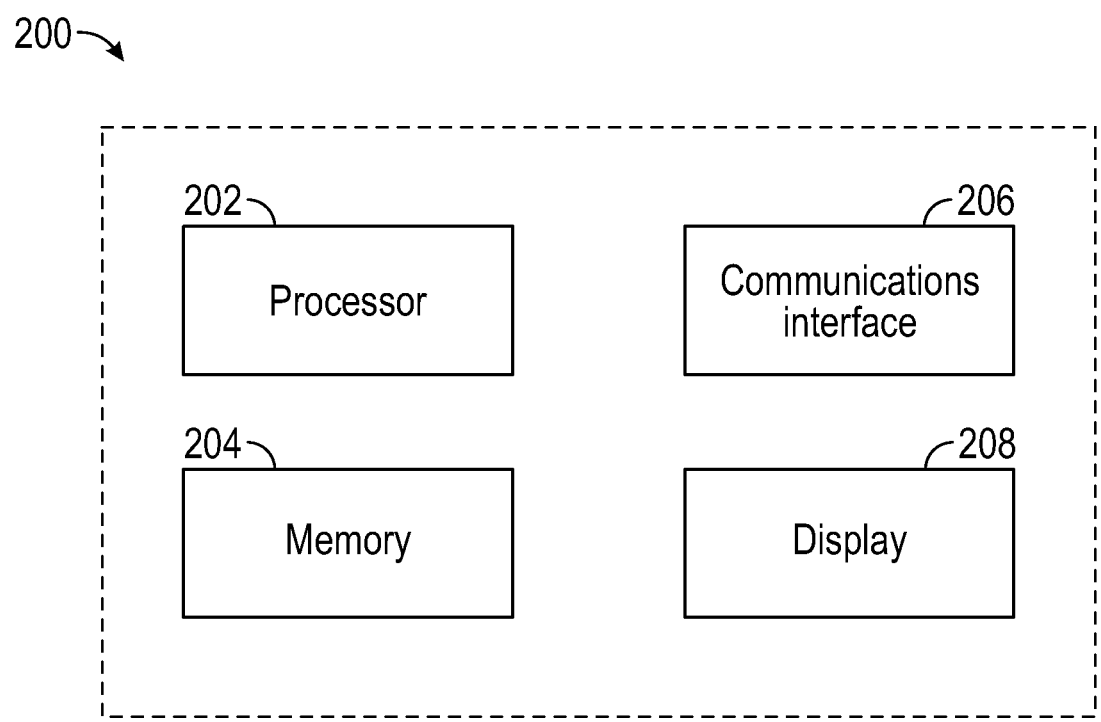
FIG. 2: shows system 200 in accordance with an embodiment of the invention.

Each of client device 102, configuration server 104, third party server, 106, and biometric device 110 may include a processing device 200, as depicted in FIG. 2. Processing device 200 includes a processor 202, a memory 204, and a communication interface 206. In examples, processing device 200 may further include a display 208.

Processor 202 may be configured for executing computer instructions, which, when executed on the system 100, perform a portion or all of the methods described in relation to FIGS. 4 to 12. In embodiments, processor 202 may include a single, or any multiple number of processors, as will be understood by those of skill in the art.

Memory 204 may be an electronically readable medium or a computer readable medium configured to store computer program instructions. In examples, memory 204 may include a non-transitory medium.

Stored computer program instructions, when executed on the processor 202, may perform a portion or all of the methods described in relation to FIGS. 4 to 12.

In examples, processor 202 and memory 204 may be incorporated into a custom chipset, such as a system on a chip. For example, processor 202 and memory 204 may be incorporated into a custom Snapdragon, Tegra, Mali-400, Cortex, Samsung Exynos, Intel Atom, Apple, or Motorola chip, or any other type of chip known to those of skill in the art.

In examples, portions of the methods described in relation to FIGS. 4 to 12 may be stored or executed outside of system 100. For example, a portion of the methods described in relation to FIGS. 4 to 12 may be stored or executed on a combination of a server and cloud storage facility via Internet 108.

Communications interface 206 may be configured to communicate with devices external to client device 102 or configuration server 104. For example, communications interface 206 may communicate with any of biometric device 110, user profile database 114, or structured data stores 116.

In examples, communications interface 206 may include wired or wireless interfaces. Communications interface 206 may include a short-range or low-powered wireless standard such as Bluetooth, Bluetooth LE, zigbee, or near field communication (NFC). Communications interface 206 may further include WIFI, 3G, 4G, Ethernet, or any other communications known to those of skill in the art. In examples, processing device 200 may request, send, or receive information, save information, or send or receive messages from a remote device over Internet 108.

In examples, client device 102 may be a hand-held or mobile computing device such as a smart phone, a tablet, a smart watch, or a wearable device. In further examples, client device 102 may be a computing apparatus such as a smart TV, a video game console, a laptop, or desktop computer, or an app-enabled piece of household hardware.

In examples, client device 102, may receive inputs from one or more integrated input devices. In further examples, however, client device 102 may be connected to any combination external input devices, including one or more biometric devices 110.

Client device 102 or biometric device 110 may include any combination of input instruments operable to receive information from a human, an animal, or an environment. In examples, client device 102 or biometric device 110 may include a finger print scanner such as a capacitive touch device, an ultrasonic, or an optical device.

In examples, client device 102 or biometric device 110 may include a facial scan device, such as an optical imaging, thermal imaging, or 3D scanning device.

In examples, client device 102 or biometric device 110 may include an eye scanner. In examples, the eye scanner may include an iris scanner or a retinal scanner using a visible, infrared, and/or a near infrared imaging device.

In examples, client device 102 or biometric device 110 may include a voice detector such as a voice recognition device or a phrase recognition device, which may include a microphone device.

In further examples, client device 102 or biometric device 110 may include any other biometric or biomonitor device capable of authenticating the identity of a user, as will be understood by those of skill in the art.

FIG. 1 includes a configuration server 104. Configuration server 104 may be operable to execute instructions, or to retrieve and save data in a database. In examples, configuration server 104 may include a single server, or multiple servers in a distributed architecture. In examples, configuration server 104 may support a relational database, a NoSQL database, a distributed database, or any other database known to those of skill.

Figure 3:
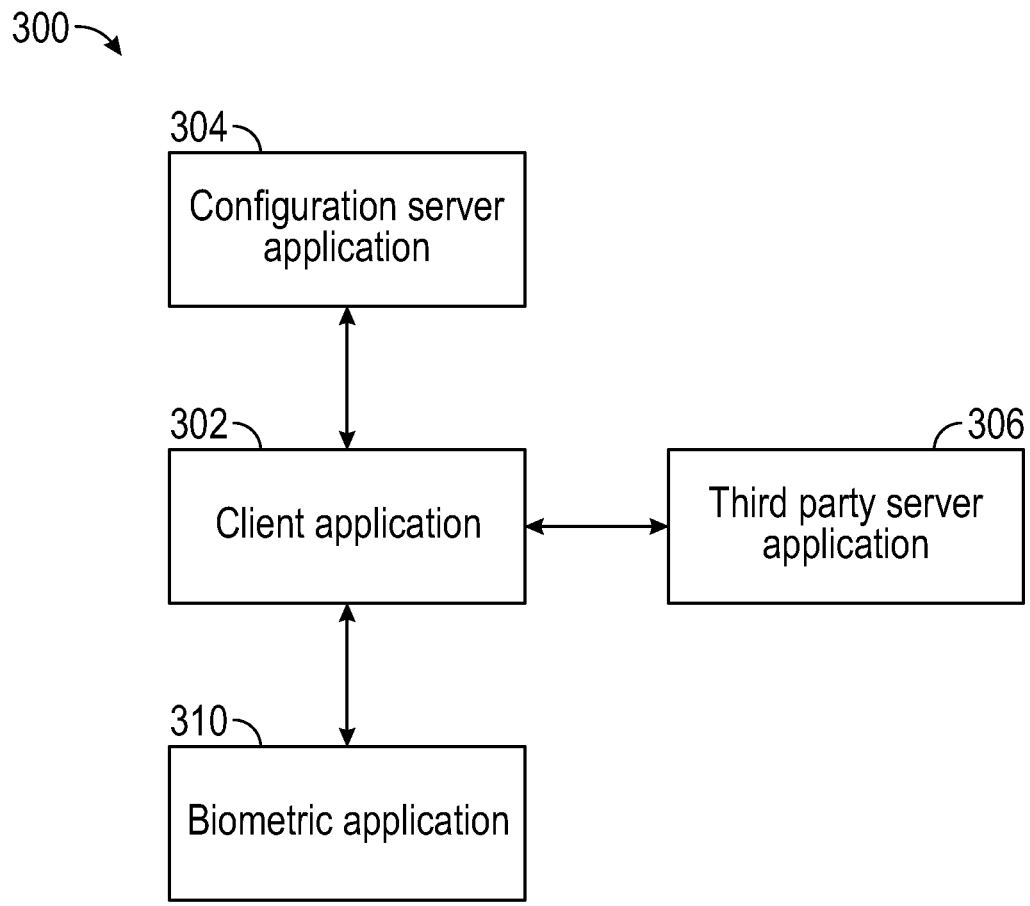
FIG. 3: shows system 300 in accordance with an embodiment of the invention.

FIG. 3 depicts system 300, in accordance with an embodiment. System 300 may facilitate configuring and providing access to a plurality of structured data stores based on a plurality of personal authentication information. System 300 includes client application 302. System 300 may further include configuration server application 304, third party server application 306, and biometric application 310.

Configuration server 304 may be configured to receive input from client application 302 to facilitate configuring and providing access to a plurality of structured data stores based on a plurality of personal authentication information.

Client application 302 may communicate with third party server application 306.

Client application 302 may communicate with biometric application 310.

In examples, client application 302, configuration server application 304, third party server application 306, and biometric application 310 may each operate on separate devices. For example, client application 302 may operate on client device 102; configuration server application 304 may operate on configuration server 102; third party server application 306 may operate on third party server 106; and biometric application 310 may operate on biometric device 110.

In further examples, however, the functions of any one of client application 302, configuration server application 304, third party server application 306, and biometric application 310 may be distributed across additional computing devices. For example, configuration server application 304 may operate across a group of distributed servers.

Figure 4:
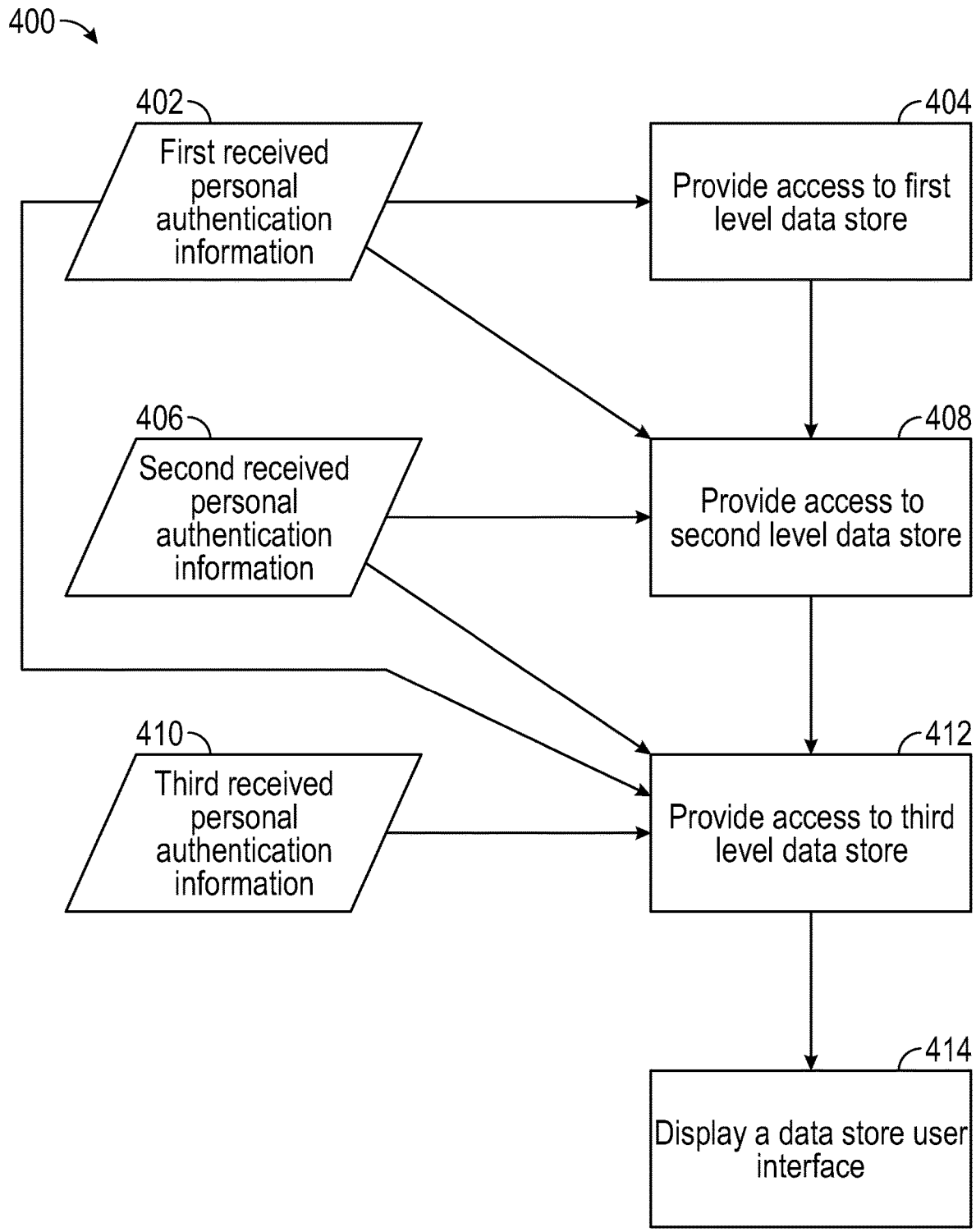
FIG. 4: shows method 400 in accordance with an embodiment of the invention.

FIG. 4 depicts method 400, an example embodiment that may execute within any combination of client application 302 or configuration server application 304. Method 400 may provide access to a plurality of structured data stores based on a plurality of personal authentication information.

Figure 5:
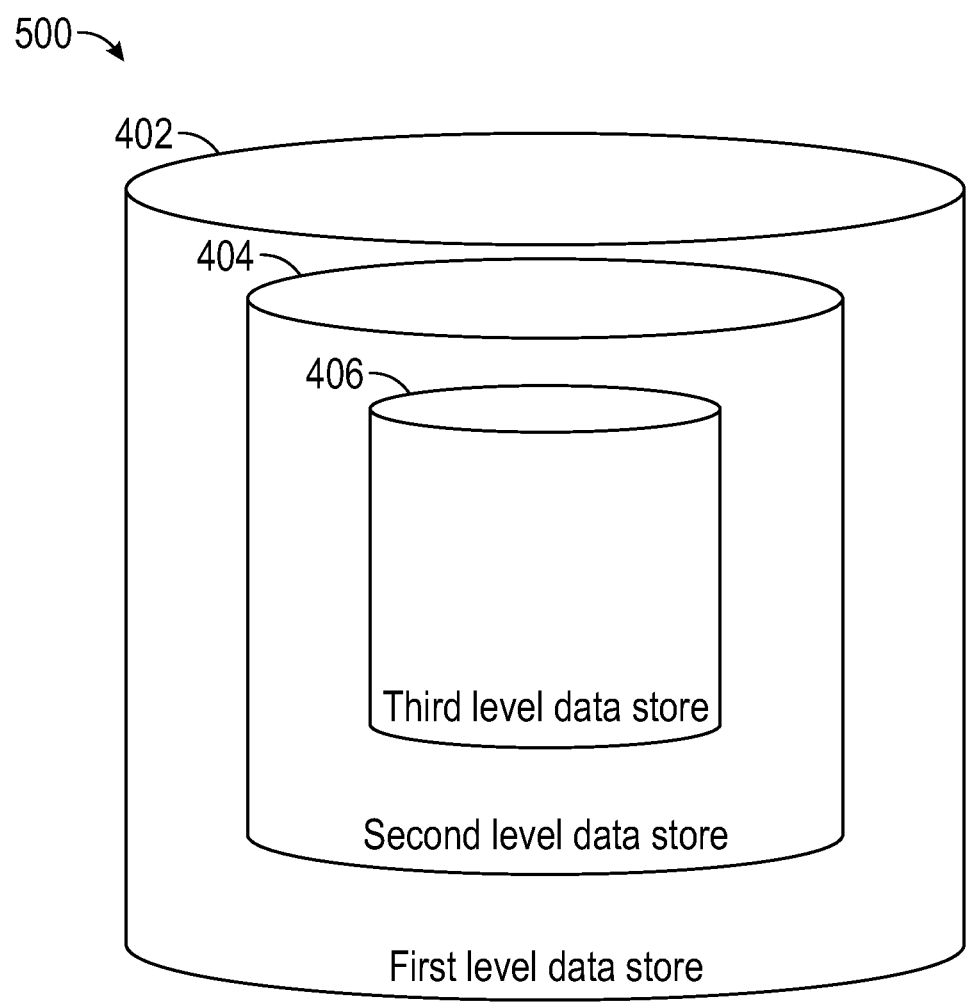
FIG. 5: shows structured data store 500 in accordance with an embodiment of the invention.

FIG. 5 depicts an example plurality of structured data stores 500. A data store is a physical or virtual repository for persistently storing and managing one or more collections of data. In examples, a data store may be a simple file, a database, or any other repository known to those of skill in the art.

As may be seen in FIG. 5, example plurality of structured data stores 500 includes first level data store 502, second level data store 504, and third level data store 506. Third level data store 506 is configured to be accessed after gaining access to second level data store 504, and both third and second data stores 506 and 504 are configured to be accessed after gaining access to first level data store 502.

A user wishing to access a data store within structured data stores 500 must be authenticated before obtaining access. Authenticating is the process of confirming the identity of a user using personal authentication information provided by the user. For example, a user wishing to access first data store 402 may be authenticated at a first level.

In examples, personal authentication information may include fingerprint data. Fingerprint data may include, data received from a finger print scanner.

Fingerprint data may include raw data, such as a two-dimensional image file, or processed data, such as feature-extraction information, an image checksum or hashing information.

In examples, personal authentication information may include voice recording information from a voice recognition device. Voice recording information may be text independent. Voice recording information may include raw data, such as an audio file, or processed data, which may include voice prints or feature-extraction information. The voice recording information may be used to authenticate a user's voice.

In examples, personal authentication information may include voice message data from a phrase recognition device. Voice message data is text dependent and may include raw data, such as an audio file, or processed data. The voice message data may be used to authenticate a speaker.

In examples, personal authentication information may include facial image information from a facial scan device. Facial image information may include raw data, such as an image file, or processed data including feature-extraction information, an image checksum or hashing information. The facial image information may be used to authenticate a user based on one or more facial features.

In examples, personal authentication information may include eye image data using an eye scanner. For example, personal authentication information may include iris image information or retinal image information. Eye image data may include raw data, such as an image data, or processed data including feature-extraction information, an image checksum or hashing information.

In examples, personal authentication information may include password data, or a password.

In examples, personal authentication information may include pin code data. For example, personal authentication information may include a passcode or a lock-screen pattern.

The examples provided of personal authentication information herein are not intended to be limiting. Those of skill in the art will readily understand that any type of information capable of authenticating a user may be used as personal authentication information to provide access to a data store. For example, any type of biometric information that can reasonably be used to identify a user may be used.

When a data store is configured to be accessed after gaining access to another data store, a user must authenticate both data stores before gaining access to the innermost data store. For example, when a second level data store 504 is configured to be accessed after gaining access to first level data store 502, as depicted in FIG. 5, a user must be authenticated at the first level data store 502 and the second level data store 504 before gaining access to the second level data store 504.

Although example structured data store 500 includes three structured data stores, this is not intended to be limiting. In examples, structured data stores 500 may include two, three, or any number of data stores.

In further examples, a third level data store 506 may not be configured to be accessed after gaining access to second level data store 504. For example, third level data store 506 may be configured to be accessed after only gaining access to first level data store 502.

Method 400 begins with step 402, a first personal authentication information 402 of the plurality of personal authentication information is received.

In examples, received personal authentication information may be received from a biometric device integrated into client device 102, or external to client device 102, such as biometric device 110.

Method 400 continues with step 404. In step 404, upon authenticating the first personal authentication information 402, access is provided to a first level data store of the plurality of structured data stores. For example, access may be provided to first level data store 502.

Method 400 continues with step 406. In step 406, a second personal authentication information of the plurality of login data is received.

Method 400 continues with step 408. In step 408, upon authenticating the second personal authentication information, and after authenticating the first personal authentication information, access is provided to a second level data store of the plurality of structured data stores. For example, access may be provided to second level data store 504.

By allowing access to the first level data store 502 upon authenticating the first personal authentication information 402, and allowing access to the second level data store 504 upon authenticating both the first personal authentication information 402 and the second personal authentication information 404, this may allow a user to set different security levels for information.

For example, a user may place less sensitive information in first level data store, and information with a higher level of sensitivity in the second level data store. When a user wishes only to access the less sensitive information in the first level data store, the user will not, therefore, also access the more sensitive information in the second level data store.

In examples, method 400 may include further steps. For example, method 400 continues with steps 410 and 412. In step 410, a third personal authentication information of the plurality of login data may be received.

In examples, method 400 may continue with step 412. In step 412, upon authenticating the third personal authentication information 410, and after authenticating the first personal authentication information 402 and the second personal authentication information 406, access to a third level data store of the plurality of structured data stores may be provided. For example, access may be provided to third level data store 506.

When third level data store 506 is configured to be accessed after gaining access to first and second level data stores 502 and 504, all three data store levels must be authenticated for a user to obtain access to third level data store 506. This may provide a user with a higher security data store for information that the user deems too sensitive to be accessed with the information contained in the first and second level data stores 502 and 504. It may also allow the user the ability to access less sensitive data without also accessing the highest sensitivity data.

By providing access to a plurality of structured data stores based on a plurality of personal authentication information, a user may protect information according to the user's perceived sensitivity of the data. This may allow a user to feel better in control of his or her information.

In examples, there may be further levels of data stores with respective personal authentication information that must be authenticated for a user to gain access, as will be understood by those of skill in the art.

In examples, an alpha personal authentication information of the plurality of personal authentication information may be a first biometric type data. Biometric type data is data that requires a biometric input from a user. For example, biometric type data may include, but is not limited to, fingerprint data, voice data, eye image data, or facial image data.

Using biometric type data as personal authentication information may allow a user to avoid the difficulty of inventing and remembering a strong password to secure the first level information store. Because a user cannot simply forget his or her biometric information, biometric personal authentication information may provide for reduced need to reset passwords. Biometric type data may be more secure than passwords as well. This may allow a user to consistently and securely access the information in the first data store.

In examples, a beta personal authentication information of a plurality of personal authentication information may be a second biometric type data that is different from the first biometric type data.

Using a first type of biometric data for the first personal authentication information and a second type of biometric data for the second personal authentication information may allow a user to easily access the second level data store without needing to invent and remember passwords.

In examples, a gamma personal authentication information of the plurality of personal authentication information may be a third data type, and the third data type being different from the first data type and the second data type. For example, the third personal authentication information may be a third type of biometric data.

For example, the first personal authentication information may include fingerprint data or a pin code, the second personal authentication information may include voice recording information or voice message data, and the third received personal identification information may include facial recognition or eye recognition data.

By assigning a different data type to each data store level, it may be possible to provide additional security for the information kept in the innermost structured data store, third level data store in the example provided.

In examples, at least one of the plurality of structured data stores includes third party authentication data. Third party authentication data may identify secure third party repositories or websites, usernames or username hints, passwords or password hints, password recovery questions, answers, or hints, or any other information related to obtaining secure information from a third party server 106.

In examples, the third party authentication data may include a password.

In examples, at least one data store of the plurality of structured data stores may include at least one of: a data file, a number, or a text string.

For example, the at least one data store of the plurality of structured data stores may include documents including any combination of text, image, video, or audio. The at least one data store of the plurality of structured data stores may further include any other type of data, such as a number, or a text string.

By allowing a user to save any combination of data files, numbers, or text strings to any one of the plurality of data stores, it may be possible to secure data or to secure passwords to third party servers including secure data within the structured data store.

In examples, at least one personal authentication information of the plurality of personal authentication information may be received within a user input timeout period.

For example, the user input timeout period may be set during a configuration step. Later when a user tries to gain access to a data store, the amount of time that it takes to provide the authentication information may be determined and compared to the user input timeout period. If it takes too long to enter the personal authentication information, then the user may not be authenticated.

For example, if the personal authentication information includes a lock-screen pattern for a smart phone, and the user attempting to authenticate takes 5 seconds to enter the pattern, but the user input timeout period is only 2 seconds, this may indicate that the subsequent user trying to gain access to a data store is not the original user.

By providing a user input timeout period, this may allow for the incorporation of a skill level into the user authentication process. This may provide for a more robust authentication process.

In examples, method 400 may continue with step 412. In step 412, a data store user interface including secure information from at least one data store of the plurality of data stores may be displayed.

In examples, displaying the data store user interface may further include displaying one or more icons associated with the secure information included in the selected data store of the plurality of data stores.

Figure 9:
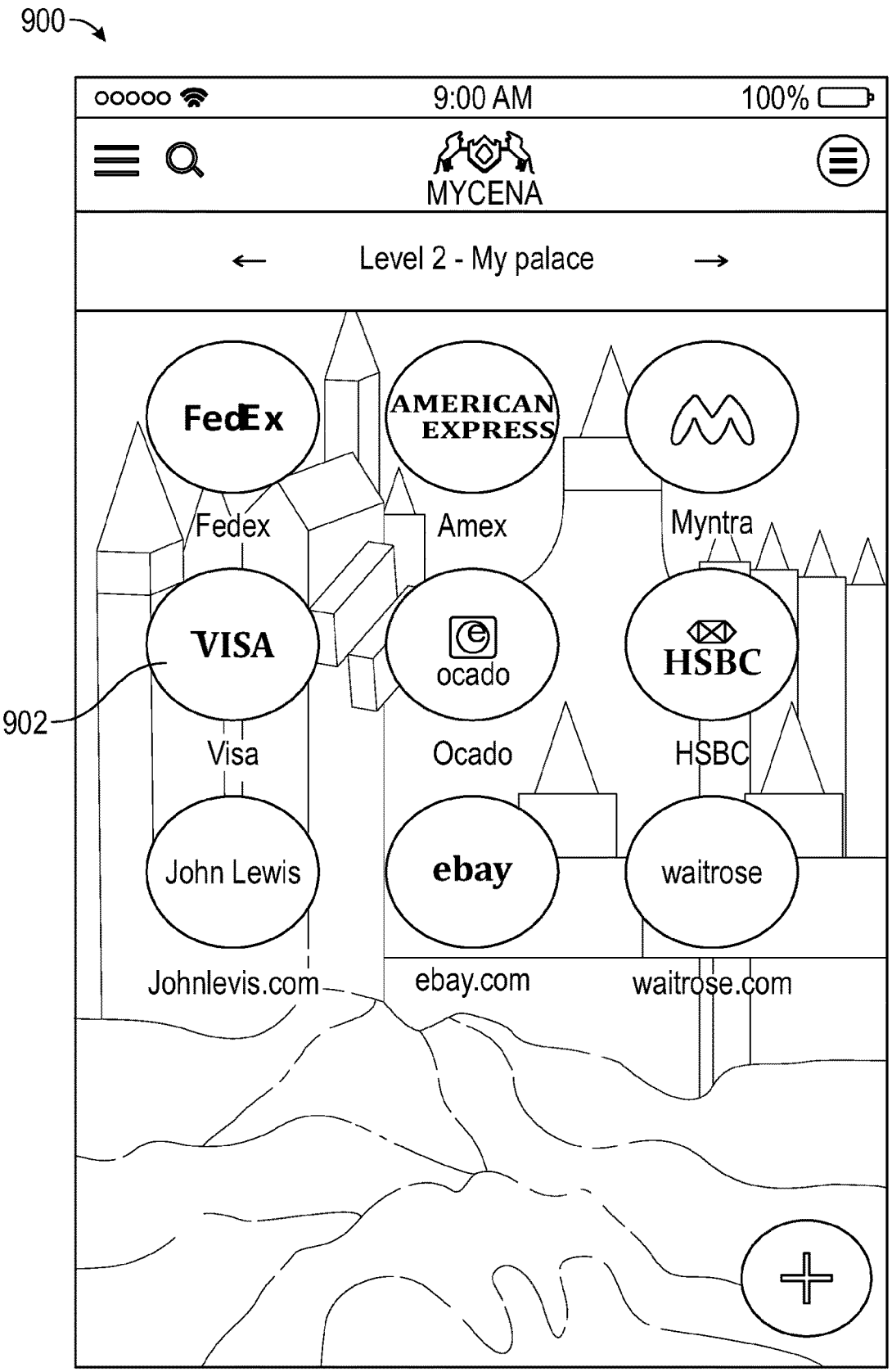
FIG. 9: shows user interface 900 in accordance with an embodiment of the invention.
Figure 10:
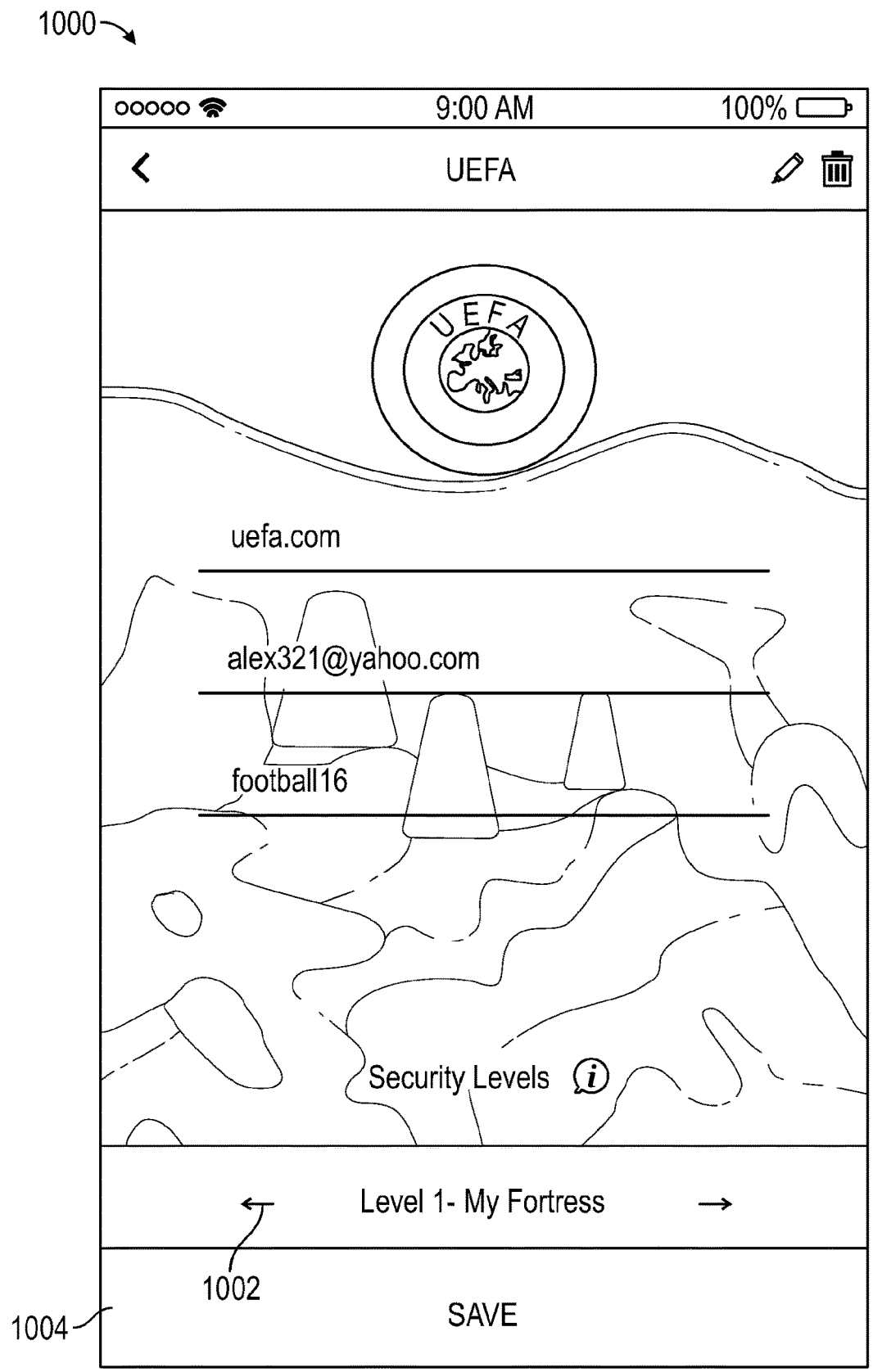
FIG. 10: shows user interface 1000 in accordance with an embodiment of the invention.
Figure 11:
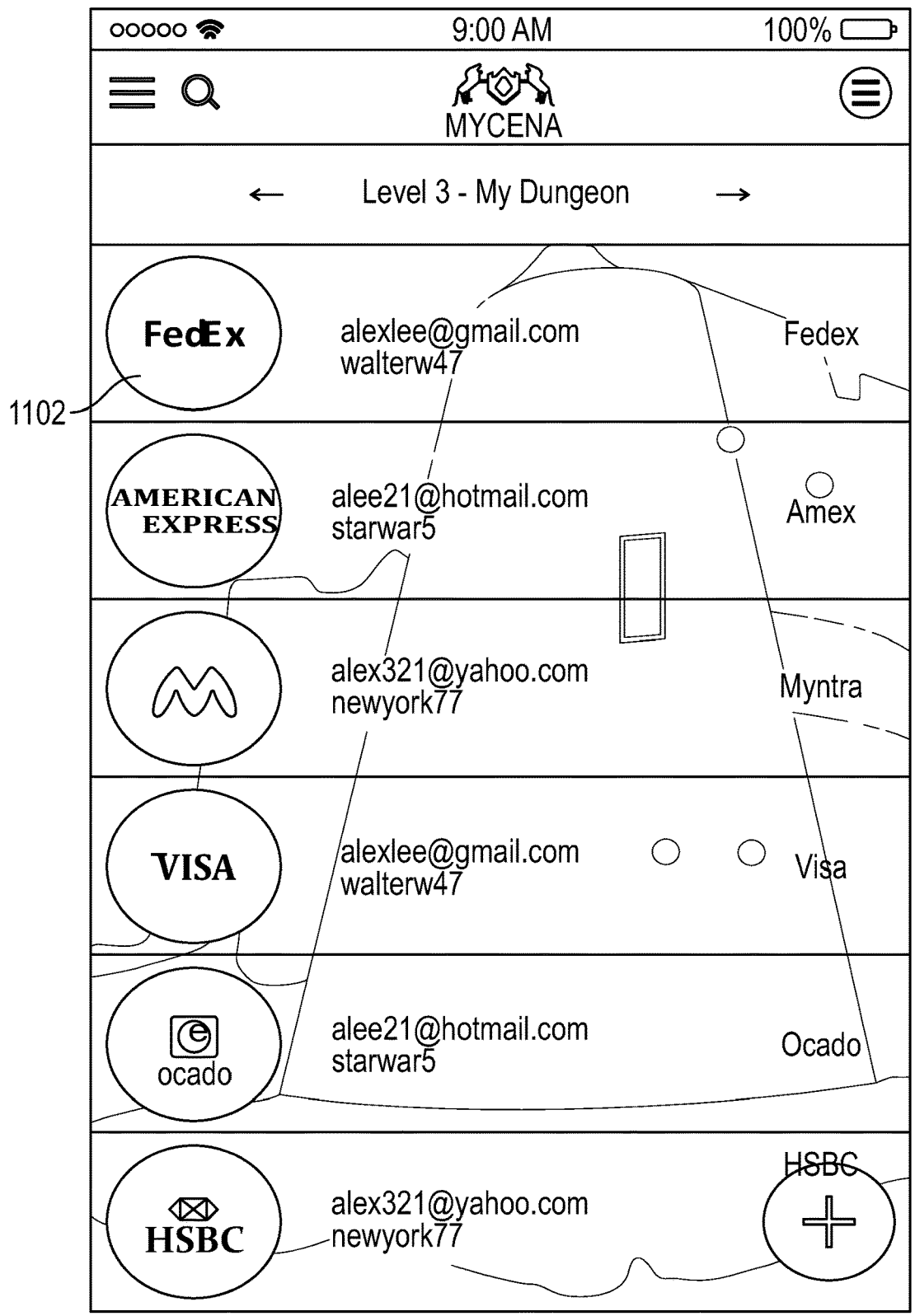
FIG. 11: shows user interface 1100 in accordance with an embodiment of the invention.

For example, FIGS. 9, 10, and 11 depict example data store user interfaces 900, 1000, and 1100, respectively.

As may be seen in data store user interface 900, icons 902 may be displayed representing secure information available in the second level data store.

Upon selecting a website icon 902, the data store user interface depicts an example display the secure information associated with the selected website icon 902.

For example, data store user interface 1000 depicts a website, "uefa.com", a username, alex321 @yahoo.com, and a password, "football16."

Data store user interfaces 900 and 1000 may allow a user to only view the secure information that the user desires to see. This may prevent others from viewing other secure information in public places, for example.

A third example is provided in data store user interface 1100. Data store user interface 1100 includes icons 1102 displayed next to websites, usernames, and passwords. This may allow a user to see all of the information in a data store in a single glance.

By allowing a user to determine what secure information is saved in each data store, providing easy, secure access to that information, and allowing the user to see all of the secure information at a glance in the data store user interface, it is possible for a user to feel in control of his or her secure information.

In examples, method 400 may further include the steps of method 600. Method 600 may include step 602. Data store change request 602 may be received for previously stored secure information, the data store change request including a new data store. A data store change request 602 is a request to change the data store that previously stored secure information is saved in.

In examples, a data store user interface may provide an easy way for a user to generate a data store change request 602. For example, data store user interface 1000 depicts a data store level selector 1002. A user may determine that previously stored information relating to a Union of European Football Associations (UEFA) website logon should saved in a new data store, or first level data store 502. Upon making the change with data store level selector 1002, a user may save by pressing the save button 1004 to generate data store change request 602.

Method 600 may further include step 604. In step 604, the previously stored secure information may be associated with the new data store.

Data store change request 602 allows a user to be in control of his or her data. He or she may change the data store, and related authentication required, to access previous stored secure information.

Method 600 may further include step 606. In step 606, a website registration image file may be received.

A website registration image file 606 is an image of a website where a user is registering to receive secure access, or reconfiguring his or her secure access. For example, website registration image file 606 may be a screenshot of a user signing up for linked in.

In examples, website registration file 606 may be a screenshot.

Method 600 may further include step 608. In step 608, text may be recognized in the website registration image file including registration related information. For example, text may be recognized using optical character recognition, or any other protocol known to those of skill in the art.

In examples, the secure information may include at least one of: a website domain, a business name, a user name, a password, a password hint, a password clue, a password reset question, an icon, or a password reset answer.

Method 600 may further include step 610. In step 610, the secure information may be associated with a selected data store of the plurality of data stores to which access has been authorized. The selected data store may be determined by the user.

This may allow a user to input information into a data store without needing to retype it. This may provide for more accurate information to be kept in a data store.

Method 600 may further include step 612. In step 612, a data store update user interface including secure information from a selected secure store of the plurality of data stores may be displayed.

Method 600 may further include step 614. In step 614, updated secure information from the user may be received from the data store update user interface. For example, the data store update user interface may allow a user to edit the secure information.

Method 600 may further include step 616. In step 616, the updated secure information may be associated with the selected data store.

Steps 612, 614, and 616 may allow a user to update the information kept in a data store.

In examples, the steps of methods 400 and 600 may be executed on a client application 302. In further examples, however, steps of methods 400 and 600 may be executed on client application 302 and configuration server 304.

Figure 12:
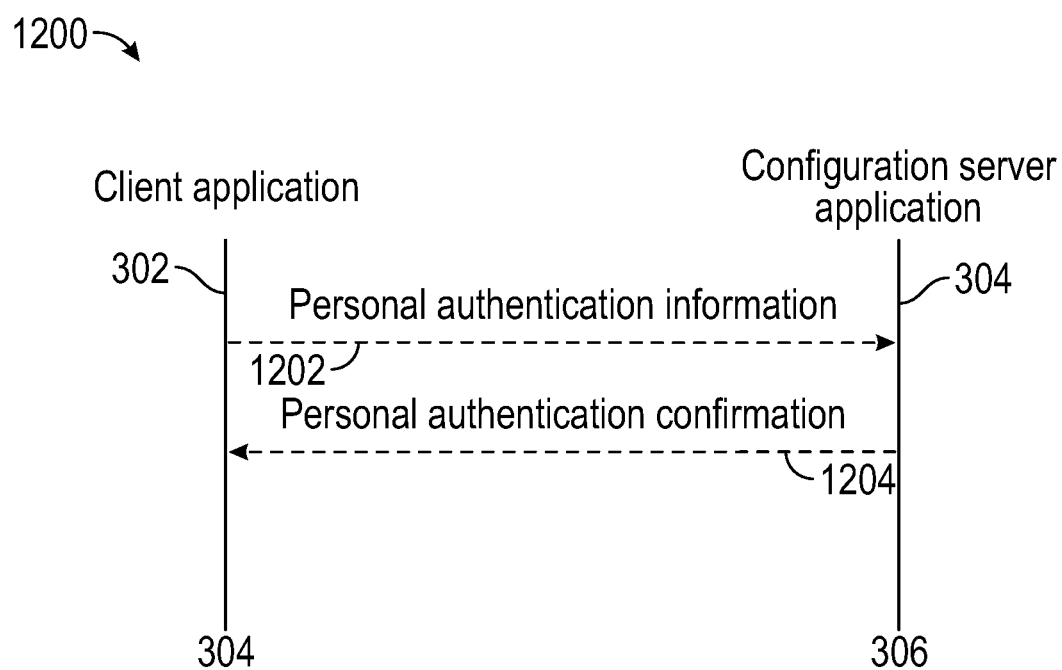
FIG. 12: shows system 1200 in accordance with an embodiment of the invention.

For example, FIG. 12 depicts system 1200. System 1200 includes client application 302 and configuration server 304.

In examples, at least one of the plurality of personal authentication information may be received from a client device. For example, message 1202 may be sent from client application 302 to configuration server application 304 including personal authentication information received from a user.

In examples, at least one personal authentication information of the plurality of personal authentication information may be sent to a server, and a personal authentication information confirmation may be received from the server. A personal authentication information confirmation is a message confirming that the personal authentication information authenticates a user. For example, message 1204 may be sent from server application 304 to client application 302.

Figure 7:
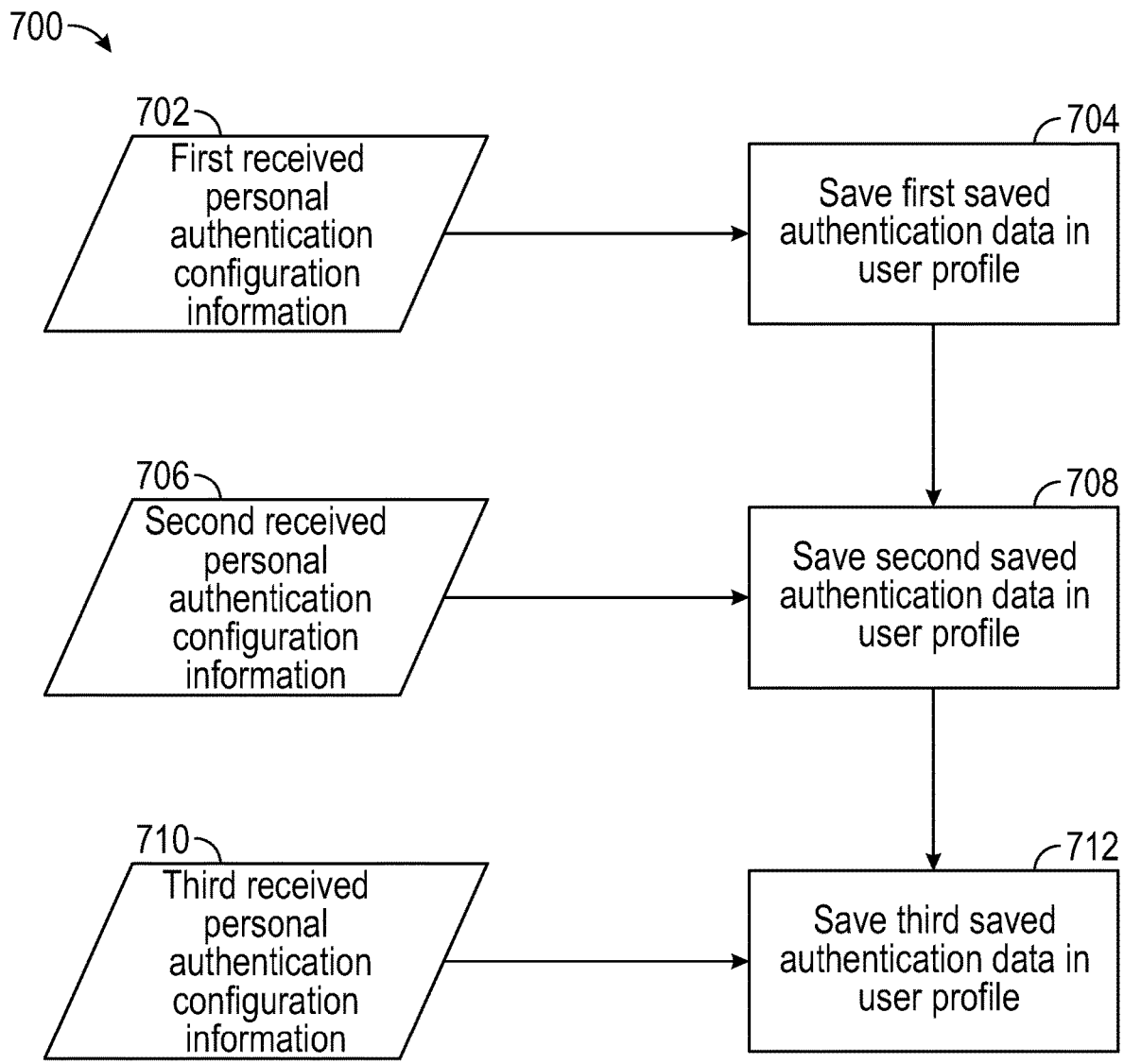
FIG. 7: shows method 700 in accordance with an embodiment of the invention.
Figure 8:
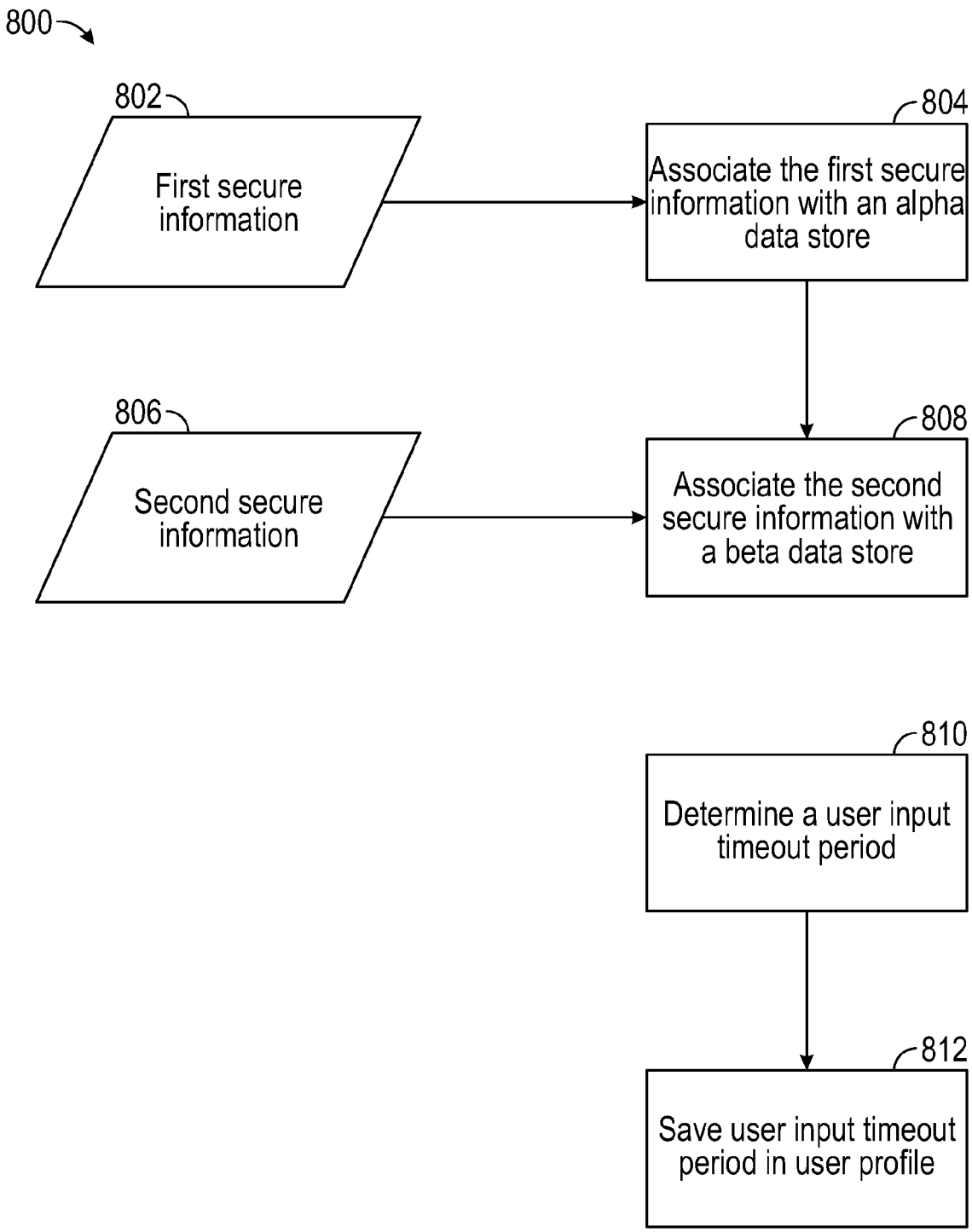
FIG. 8: shows method 800 in accordance with an embodiment of the invention.

FIG. 7 depicts a further embodiment method 700 of the application. Method 700 may be used to configure access to a structured data store. Method 700 begins with step 702. In step 702, a first personal authentication configuration information is received.

A first personal authentication configuration information is the information received when a user configures access to a data store. For example, if the first level data store will require fingerprint personal authentication information, first personal authentication configuration information 702 includes initial fingerprint data.

Method 700 continues with step 704. In step 704, first saved authentication data based on the first personal authentication configuration information 702 is saved in a user profile. Saved authentication data is what will be used to authenticate later received personal authentication information.

In examples, for example when the authentication information is a password, the first saved authentication data may be the same as the first personal authentication configuration information.

In further examples, however, the first saved authentication data may be different from the first personal authentication configuration information. For example, if first personal authentication configuration information 702 includes an image, such as a fingerprint image, the first saved authentication data may include one or more features derived from the fingerprint image. Alternatively, first personal authentication configuration information 702 may include a hash of the image.

The user profile includes the saved authentication data, which may be used to authenticate a user.

Method 700 continues with step 706. In step 706, a second personal authentication configuration information is received.

Method 700 continues with step 708. In step 708, second saved authentication data based on the second personal authentication configuration information is saved in the user profile. Authenticating the first personal authentication information of a plurality of authentication information to provide access to a first level data store of the plurality of structured data stores includes using the first saved authentication data, and authenticating a second personal authentication information of the plurality of authentication information to provide access to a second level data store of the plurality of structured data stores includes using the second saved authentication data, after authenticating the first personal authentication information.

Figure 6:
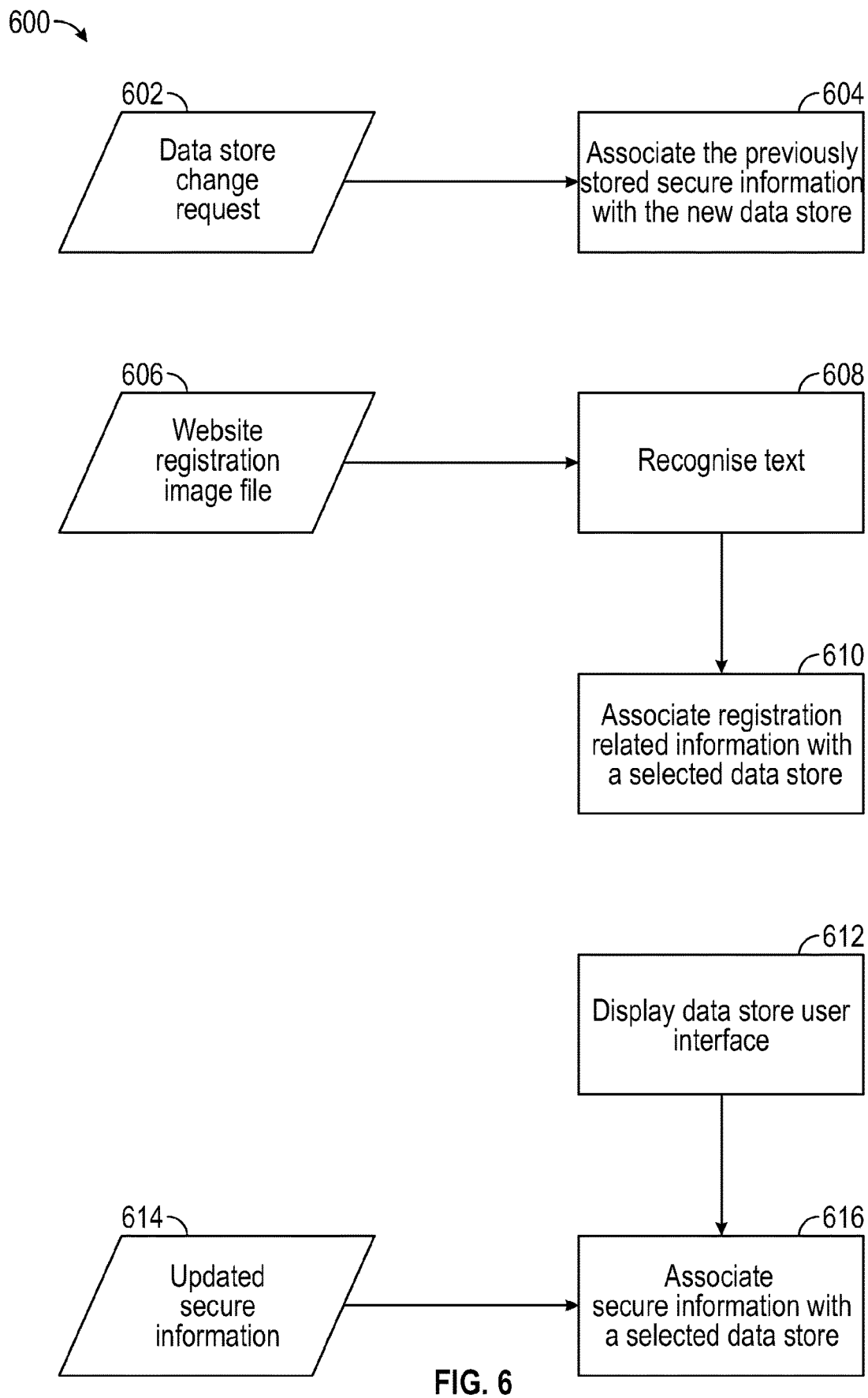
FIG. 6: shows method 600 in accordance with an embodiment of the invention.

By allowing a user to save personal authentication data in a user profile, it is possible to configure the structured data store 500 to have all the same benefits discussed with regards to FIGS. 4, 5, and 6.

In examples, method 700 may include further steps. For example, method 700 may include step 710. In step 710, a third personal authentication configuration information may be received.

Method 700 may further include step 712. In step 712, the third personal authentication configuration information may be saved as third saved authentication data may be saved in the user profile. Authenticating the third personal authentication information of the plurality of authentication information to provide access to a third level data store of the plurality of structured data stores may include using the third saved authentication data, after authenticating the first personal authentication information and the second personal authentication information.

In examples, method 700 may include further steps. For example, method 700 may include any of the steps of method 800.

In examples, method 800 may include steps 802 and 804. In step 802, a first secure information may be received.

In step 804, the first secure information may be associated with an alpha data store of the plurality of data stores. For example, the alpha data store may be first level data store 502, second level data store 504, or third level data store 506.

In examples, method 800 may include steps 806 and 808. In step 806, a second secure information may be received.

In step 808, the second secure information may be associated with a beta data store of the plurality of data stores. For example, the beta data store may be first level data store 502, second level data store 504, or third level data store 506.

In examples, an alpha personal authentication information of the plurality of personal authentication information may be a first biometric type data.

In examples, a beta personal authentication information of the plurality of personal authentication information may be a second biometric type data that is different from the first biometric type data.

In examples, a gamma of the plurality of personal authentication information may be a third data type, and the third data type may be different from the first data type and the second data type.

In examples, at least one of the plurality of structured data stores may include third party authentication data.

In examples, the third party authentication data may include a password.

In examples, at least one data store of the plurality of structured data stores may include at least one of: a data file, a number, or a text string.

In examples, the plurality of personal authentication information may include at least one of: fingerprint data, a pin code, voice recording information, voice message data, facial image information, iris image information, or retinal image information.

In examples, method 700 may further include steps 606, 608, and 610 of method 600.

In examples, receiving at least one of the first personal authentication confirmation information, the second personal authentication confirmation information, or a third personal authentication confirmation information may further include steps 810 and 812 of method 800.

In step 810, a user input timeout period may be determined.

In step 812, the user input timeout period may be saved with the user profile.

By providing structured access to secure information in structured data stores, it may be possible to provide secured access to information of various levels of sensitivity, allowing a user to feel that their information is secure and that they are in control of where it is kept.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method of providing access to a plurality of structured data stores based on a plurality of personal authentication information, the method comprising:
   receiving a first personal authentication information of the plurality of personal authentication information from a user;
   upon authenticating the first personal authentication information, providing user access to a first level data store of the plurality of structured data stores, the first level data store storing a plurality of username/password pairs, each pair for accessing one of a plurality of servers;
   once user access to the first level data store is provided, the user retrieving one of the username/password pairs in the first level data store and accessing an associated server using the retrieved username/password pair in the first level data store;
   receiving a second personal authentication information of the plurality of personal authentication information from the user;
   upon authenticating the second personal authentication information within user input timeout period, and after authenticating the first personal authentication information, providing user access to a second level data store of the plurality of structured data stores, the second level data store storing a plurality of username/password pairs, each pair for accessing one of a plurality of servers;
   once user access to the second level data store is provided, the user retrieving one of the username/password pairs in the second level data store and accessing an associated server using the retrieved username/password pair in the second level data store;
   receiving a third personal authentication information of the plurality of personal authentication information from the user;
   upon authenticating the third personal authentication information within a user input timeout period and after authenticating the first personal authentication information and the second personal authentication information, providing user access to a third level data store of the plurality of structured data stores, the third level data store storing a plurality of username/password pairs, each pair for accessing one of a plurality of servers; and
   once user access to the third level data store is provided, the user retrieving one of the username/password pairs in the third level data store and accessing an associated server using the retrieved username/password pair in the third level data store,
   wherein the first, second, and third personal authentication information are of different types to one another.

2. A method as claimed in claim 1, wherein an alpha personal authentication information of the plurality of personal authentication information is a first biometric type data,
   wherein a beta personal authentication information of the plurality of personal authentication information is a second biometric type data that is different from the first biometric type data, and
   wherein a gamma personal authentication information of the plurality of personal authentication information is a third data type, and the third data type is different from the first data type and the second data type.

3. A method as claimed in claim 1, wherein at least one of the plurality of structured data stores includes third party authentication data.

4. A method as claimed in claim 3, wherein the third party authentication data includes a password.

5. A method as claimed in claim 1, wherein at least one data store of the plurality of structured data stores includes at least one of: a data file, a number, or a text string.

6. A method as claimed in claim 1, wherein the plurality of personal authentication information includes at least one of: fingerprint data, a pin code, voice recording information, voice message data, facial image information, iris image information, or retinal image information.

7. A method as claimed in claim 1, further comprising:
   displaying a data store user interface including secure information from at least one data store of the plurality of data stores.

8. A method as claimed in claim 7, wherein displaying the data store user interface further includes displaying one or more icons associated with the secure information included in a selected data store of the plurality of data stores.

9. A method as claimed in claim 1, further comprising:
   receiving a data store change request for previously stored secure information, the data store change request including a new data store; and
   associating the previously stored secure information with the new data store.

10. A method as claimed in claim 1, further comprising:
    receiving a website registration image file;
    recognizing text in the website registration image file including registration related information; and
    associating secure information with a selected data store of the plurality of data stores to which access has been authorized.

11. A method as in claim 10, wherein the registration related information includes at least one of: a website domain, a business name, a user name, a password, a password hint, a password clue, a reset question, an icon, or as reset answer.

12. A method as claimed in claim 1, further comprising:
    displaying a data store update user interface including secure information from a selected secure data store of the plurality of data stores;
    receiving updated secure information from the user; and
    associating the updated secure information with the selected secure data store.

13. A method as claimed in claim 1, wherein receiving at least one of the plurality of personal authentication information further comprises:
    receiving the at least one of the plurality of personal authentication information from a client device.

14. A method as claimed in claim 1, wherein authenticating the first personal authentication information or authenticating the second personal authentication information further comprises:
    sending the at least one personal authentication information of the plurality of personal authentication information to a server associated with the at least one personal authentication information; and
    receiving a personal authentication information confirmation from the server associated with the at least one personal authentication information.

15. A method of configuring access to a plurality of structured data stores, the method comprising:

receiving a first personal authentication configuration information;
saving first saved authentication data based on the first personal authentication configuration information in a user profile;
receiving a second personal authentication configuration information from the user;
saving second saved authentication data based on the second personal authentication configuration information in the user profile;
receiving a third personal authentication configuration information from the user; and
saving the third personal authentication configuration information as third saved authentication data in the user profile
wherein authenticating a first personal authentication information of a plurality of authentication information to provide access to a first level data store of the plurality of structured data stores includes using the first saved authentication data;
authenticating a second personal authentication information of the plurality of authentication information within a user timeout period to provide access to a second level data store of the plurality of structured data stores includes using the second saved authentication data, after authenticating the first personal authentication information; and
authenticating a third personal authentication information of the plurality of authentication information within a user timeout period to provide access to a third level data store of the plurality of structured data stores includes using the third saved authentication data, after authenticating the first personal authentication information and the second personal authentication information;
each of the first, second and third level data stores storing a plurality of username/password pairs, each pair for accessing one of a plurality of servers;
once user access to each of the first, second and third level data stores is provided, the user retrieving one of the username/password pairs in the corresponding level data store and accessing an associated server using the username/password pair; and
the first, second, and third personal authentication information are of different types to one another.

16. A method as claimed in claim 15, further comprising:
receiving a first secure information; and
associating the first secure information with an alpha data store of the plurality of data stores.

17. A method as claimed in claim 15, further comprising:
receiving a second secure information; and
associating the second secure information with a beta data store of the plurality of data stores.

18. A method as claimed in claim 15, wherein an alpha personal authentication information of the plurality of personal authentication information is a first biometric type data.

19. A method as claimed in claim 18, wherein a beta personal authentication information of the plurality of personal authentication information is a second biometric type data that is different from the first biometric type data.

20. A method as claimed in claim 19, wherein a gamma personal authentication information of the plurality of personal authentication information is a third data type, and the third data type is different from the first data type and the second data type.

21. A method as claimed in claim 15, wherein at least one of the plurality of structured data stores includes third party authentication data.

22. A apparatus for providing access to a plurality of structured data stores based on a plurality of personal authentication information, the apparatus comprising:
a memory; and
a processor configured to execute computer instructions stored in the memory, the computer instructions when executed control the apparatus to:
receive a first personal authentication information of the plurality of personal authentication information from a user;
upon authenticating the first personal authentication information, provide user access to a first level data store of the plurality of structured data stores, the first level data store storing a plurality of username/password pairs, each pair for accessing one of a plurality of servers;
once user access to the first level data store is provided, retrieve one of the username/password pairs in the first level data store and access an associated server using the retrieved username/password pair in the first level data store;
receiving a second personal authentication information of the plurality of personal authentication information from the user;
upon authenticating the second personal authentication information within user input timeout period and after authenticating the first personal authentication information, provide user access to a second level data store of the plurality of structured data stores, the second level data store storing a plurality of username/password pairs, each pair for accessing one of a plurality of servers;
once user access to the second level data store is provided, retrieve one of the username/password pairs in the second level data store and access an associated server using the retrieved username/password pair in the second level data store;
receive a third personal authentication information of the plurality of personal authentication information from the user;
upon authenticating the third personal authentication information within a user input timeout period and after authenticating the first personal authentication information and the second personal authentication information, provide user access to a third level data store of the plurality of structured data stores, the third level data store storing a plurality of username/password pairs, each pair for accessing one of a plurality of servers; and
once user access to the third level data store is provided, retrieve one of the username/password pairs in the third level data store and access an associated server using the retrieved username/password pair in the third level data store,
wherein the first, second, and third personal authentication information are of different types to one another.

* * * * *